June 11, 1957 D. A. McCAULAY ET AL 2,795,632
SECONDARY ALKYLTOLUENE PRODUCTION
Filed Nov. 27, 1953
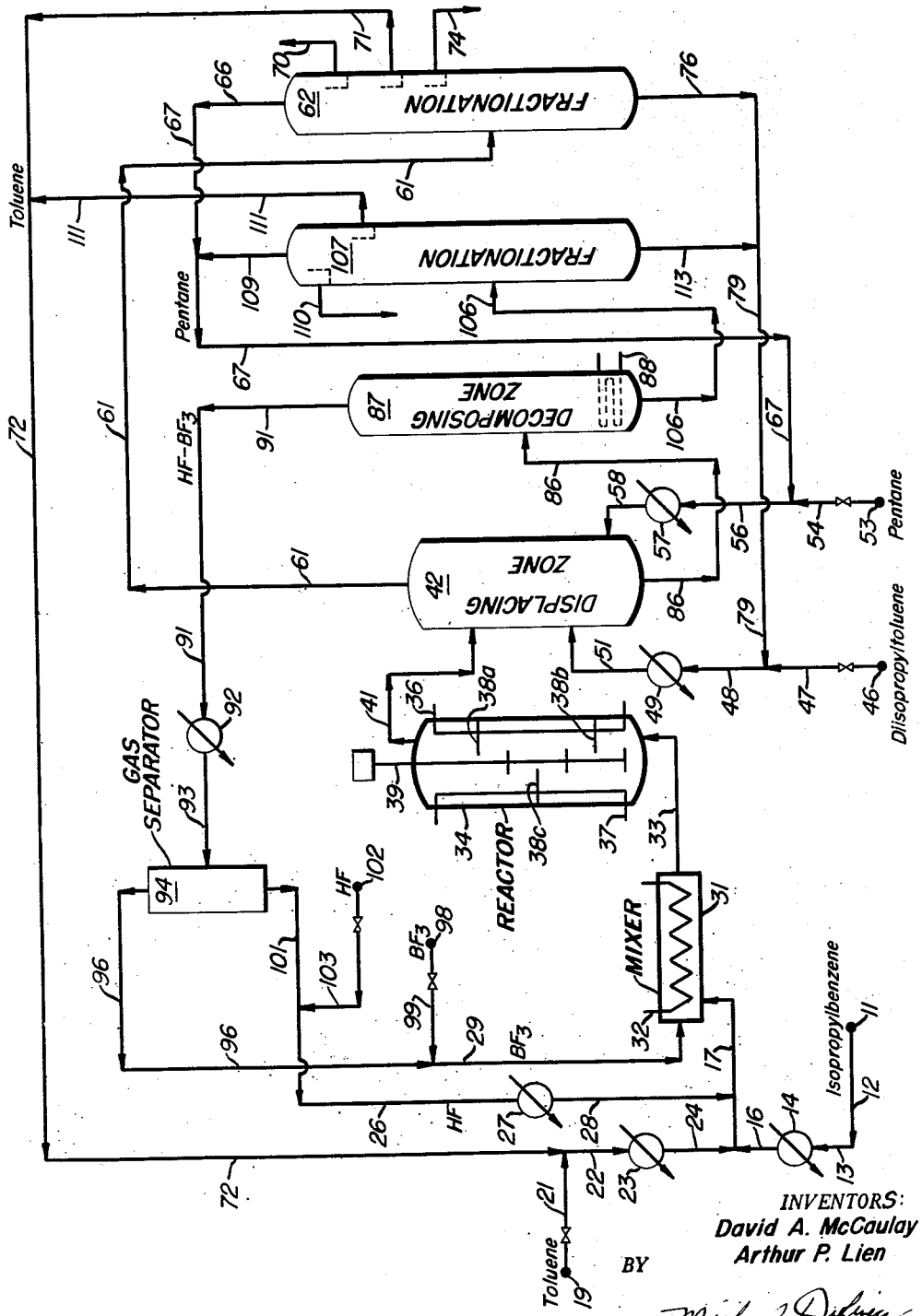
INVENTORS:
David A. McCaulay
Arthur P. Lien
BY
Michael Difinny
ATTORNEY

2,795,632
SECONDARY ALKYLTOLUENE PRODUCTION

David A. McCaulay, Chicago, Ill., and Arthur P. Lien, Highland, Ind., assignors to Standard Oil Company, Chicago, Ill., a corporation of Indiana Application November 27, 1953, Serial No. 394,711

10 Claims. (Cl. 260—671)

This invention relates to the production of certain secondary alkyltoluenes. More particularly the invention relates to the production of isopropyltoluene and secondary butyltoluene. Still more particularly the invention relates to the production of essentially pure meta isopropyltoluene (m-cymene) and 1,3,5-di-isopropyltoluene (3,5-di-isopropyl-1-methylbenzene) by the interaction of isopropylbenzene and toluene.

The development of the hydroperoxide synthesis for phenol using isopropylbenzene as the starting material or substituted secondary alkylbenzenes has resulted in a demand for substituted secondary alkylbenzenes. Since certain phenols have particularly desirable properties for use as chemical intermediates, a demand has arisen for large quantities of various substituted secondary alkylbenzenes of high purity, i. e., about 95%, and also essentially pure, i. e., 99%, compounds. Of particular interest are meta isopropyltoluene and 1,3,5-di-isopropyltoluene. Meta isopropyltoluene is also of interest to the high polymer industry as a raw material for the manufacture of styrene type plastics having a softening point higher than that of polystyrene.

It is an object of this invention to produce secondary alkyltoluenes. Another object is the preparation of the symmetrical 1,3,5-di-sec-alkyltoluene and/or meta-sec-alkyltoluene. A particular object is the preparation of 1,3,5-di-isopropyltoluene and meta isopropyltoluene. Still another object is a process for the preparation of essentially pure 1,3,5-di-sec-alkyltoluene and/or meta-sec-alkyltoluene by the interaction of a sec-alkyl benzene with toluene.

High purity 1,3,5-di-secondary alkyltoluene, i. e., 3,5-di-sec-alkyl-1-methylbenzene, and/or meta secondary alkyltoluene is prepared by interacting toluene and a secondary alkylbenzene selected from the class consisting of isopropylbenzene and sec-butylbenzene, either the mono, the di-, or the tri-derivative; a mol ratio of toluene to alkyl groups in the alkylbenzene of at least 0.5 is used. The interaction is carried out in the presence of at least enough liquid HF to form a separate acid phase and at least 0.5 mol of BF$_3$ per mol of alkyl groups in said alkylbenzene. The mixture of feed and HF–BF$_3$ agent is maintained at a temperature of not more than about +40° C. for a time sufficient for the formation of a reaction product containing at least a secondary alkyltoluene fraction which consists of high purity meta sec-alkyltoluene. A product hydrocarbon mixture is obtained by removing the HF and the BF$_3$ and high purity 1,3,5-di-sec-alkyltoluene and/or meta sec-alkyltoluene are recovered from the product mixture.

As used herein, interaction involves two alkylbenzenes containing different alkyl groups reacting to transfer an alkyl group from one alkylbenzene to the other alkylbenzene to form an alkylbenzene containing at least two different alkyl groups. Disproportionation as generally understood differs from interaction in that the two alkylbenzenes involved in the reaction contain the same alkyl groups; thus disproportionation involves the reaction of two alkylbenzenes containing the same alkyl groups wherein an alkyl group is transferred from one alkylbenzene to the other alkylbenzene to produce an alkylbenzene containing more alkyl groups than are present in the parent alkylbenzenes.

To illustrate: The process of this invention involves the interaction of toluene and an isopropylbenzene to form di-isopropyltoluene and/or isopropyltoluene and benzene. In the absence of toluene, isopropylbenzene or sec-butylbenzene undergo a disproportionation to produce the corresponding di-sec-alkylbenzene, tri-sec-alkylbenzene and benzene.

The secondary alkylbenzene component of the feed to the process is a member selected from the class consisting of secondary alkylbenzene, di-secondary alkylbenzene, tri-secondary alkylbenzene and mixtures thereof, wherein the alkyl groups are selected from the class consisting of isopropyl and secondary butyl. It is preferred to use the sec-alkylbenzene and di-sec-alkylbenzenes; to obtain a single product, either an isopropylbenzene or a sec-butylbenzene is charged.

The other reactive component of the feed is toluene.

In addition to the toluene and sec-alkylbenzene, the feed may contain hydrocarbons which are inert to the action of the HF–BF$_3$ agent and also do not participate to any appreciable extent in interaction with either toluene or the defined sec-alkylbenzene. Examples of undesirable aromatic hydrocarbons are xylene, ethylbenzene and t-butylbenzene.

Benzene is a by-product of the interaction process of this invention. The presence of added benzene in the feed has no significant adverse effect on the direction of the interaction; however, the presence of large amounts of added benzene in the feed slows down the rate of interaction.

Paraffins, particularly the lower boiling paraffins, do not in themselves interfere with the interaction. Owing to their low solubility in the acid phase, the presence of more than a small amount of paraffins, e. g., 3%, in the feed results in the presence of a second hydrocarbon phase in the reaction zone.

The presence of a second hydrocarbon phase in the reaction zone, either paraffin or toluene, does have an adverse effect on the rate of interaction. It is preferred to operate under conditions of feed composition and amounts of liquid HF and BF$_3$ usage such that essentially a single homogeneous liquid phase exists in the reaction zone, i. e., essentially all the feed is dissolved in the acid phase.

The feed to the interaction process should contain toluene and sec-alkylbenzene in a mol ratio of toluene to sec-alkyl groups, that is determined by the interaction product distribution. Herein "interaction product" is intended to include only sec-alkyltoluene and di-sec-alkyltoluene, even though benzene is also produced. The presence of sec-alkyl groups in an amount in excess of the ability of the toluene present to accept them in the form of di-sec-alkyltoluene and/or sec-alkyltoluene results in the production of disproportionation products of the sec-alkyl benzene and other side reactions. While poly-sec-alkylbenzenes can be recycled to the interaction process, it is wasteful; the use of an excess of sec-alkyl groups should be avoided.

The ratio of toluene to sec-alkyl groups is determined by the interaction product distribution. When the product is exclusively sec-alkyltoluene, at least one mol of toluene is present per mol of sec-alkyl groups charged. When the interaction product is exclusively di-sec-alkyltoluene, the mol ratio of toluene to sec-alkyl groups is at least 0.5. (Under the conditions set out herein, the interaction product mixture always contains some sec-alkyltoluene.)

When the interaction product is exclusively sec-alkyltoluene, the ratio of toluene to isopropylbenzene or sec-butylbenzene charged is at least 1, preferably between 1 and 1.2; and the ratio of toluene to di-isopropylbenzene or di-sec-butylbenzene is at least 2, preferably between 2 and 2.4. When the interaction product is sec-alkyltoluene and di-sec-alkyltoluene—the predominant interaction product, the ratio of toluene to isopropylbenzene or sec-butylbenzene is at least about 1, preferably between 1 and 1.2; and the ratio of toluene to di-isopropylbenzene or di-sec-butylbenzene is at least about 2, preferably between 2 and 2.4.

The process is carried out under substantially anhydrous conditions. The liquid hydrogen fluoride used should contain not more than about 2 or 3% of water. Commercial grade anhydrous hydrofluoric acid is suitable.

Enough liquid HF must be present in the reaction zone to form a separate distinct acid phase. More than this amount is desirable; usually between about 3 and about 50 mols of liquid HF are used per mol of total alkylbenzene feed, i. e., toluene and sec-alkylbenzene charged. The preferred usage of liquid HF is between about 5 and 20 mols per mol of total alkylbenzene feed.

Boron trifluoride, i. e., $BF_3$, must be present in the reaction zone in at least a catalytically effective amount, for example, 0.1 mol per mol of sec-alkyl groups charged. More than this amount of $BF_3$ has a favorable influence on the interaction; at least 0.5 mol per mole of sec-alkyl groups charged should be used, preferably at least about 1 mol. When the interaction product is exclusively sec-alkyltoluene, at least 1 mol of $BF_3$ should be used per mol of sec-alkyl groups charged. For example, when isopropylbenzene is charged, the $BF_3$ usage is at least 1 mol per mol of isopropylbenzene; when di-isopropylbenzene is charged, the $BF_3$ usage is at least 2 mols per mol of di-isopropylbenzene. A large excess of $BF_3$ is not necessary.

The interaction is carried out at a temperature of not more than about $+40°$ C. Operation at this temperature for times in excess of about 2 or 3 hours or for shorter times at higher temperatures results in a considerable amount of side reaction products, such as gas and condensed ring compounds. The interaction may be carried out at temperatures as low as about $-40°$ C., if long contacting times can be tolerated.

The contacting times are dependent on the temperature, product distribution and type of sec-alkylbenzene charged. It is possible to operate under conditions of time and temperature such that, within experimental error, the interaction product is entirely isopropyltoluene or sec-butyltoluene. Under other conditions, the reaction product mixture contains both sec-alkyltoluene and di-sec-alkyltoluene. A mixture can be obtained which contains di-sec-alkyltoluene as the predominant interaction product; however, some sec-alkyltoluene is always present in the reaction product mixture at the conditions set out herein.

When isopropyltoluene or sec-butyltoluene is desired as essentially the only interaction product mixture, the preferred temperature usage is between about $-30°$ C. and about $0°$ C. The time of contacting is between about 5 minutes and 2 hours, when mono-sec-alkylbenzene is charged; and between about 15 minutes and 4 hours when di-sec-alkylbenzene is charged—the longer times corresponding to the lower temperatures.

When di-isopropyltoluene or di-sec-butyltoluene is the predominant interaction product, the preferred temperature usage is between about $+10°$ C. and about $+30°$ C. The time of contacting is between about 5 minutes and 1 hour, when mono-sec-alkylbenzene is charged; and between about 5 minutes and 3 hours when di-sec-alkylbenzene is charged—the longer times corresponding to the lower temperatures.

When a tri-sec-alkylbenzene is charged, much longer times are needed than when di-sec-alkylbenzene is charged.

At the preferred conditions of operation the sec-alkyltoluene fraction consists essentially of the meta-isomer and the di-sec-alkyltoluene fraction consists essentially of the 1,3,5-isomer. Operation at higher temperatures for prolonged times results in the production of some of the ortho and para isomers. However, in general the sec-alkyltoluene fraction contains at least about 95% of the meta-isomer, i. e., consists of high purity meta-isopropyltoluene or meta-sec-butyltoluene.

Even when two distinct liquid phases are present in the reaction zone, the sec-alkyltoluene product is found almost entirely in the acid phase. The sec-alkyltoluene is present in the acid phase in the form of a complex containing 1 mol of $BF_3$ and probably 1 mol of HF per mol of sec-alkyltoluene. When operating with the preferred amounts of toluene, the excess toluene is physically dissolved in the acid phase.

PRODUCT RECOVERY

The reaction product mixture may be recovered from the acid phase by various methods. Probably the simplest procedure and one most suitable for laboratory work consists of adding the acid phase to crushed ice; and the acid phase may be contacted with aqueous alkaline solution, such as sodium hydroxide, potassium hydroxide and ammonia. It is desirable to prevent rearrangement reactions by the use of a cold aqueous reagent.

The hydrocarbons originally present in the acid phase appear as an upper oil layer above a lower aqueous layer. The upper oil layer may be separated by decantation and may be treated with dilute aqueous alkaline solution to remove any HF and $BF_3$ occluded therein.

Both HF and $BF_3$ are relatively expensive chemicals and it is desirable in an economic process to recover these and to recycle them for reuse in the process. The HF and the $BF_3$ may be readily removed from the acid phase by heating the acid phase or by applying a vacuum thereto. The HF and the $BF_3$ distill overhead and may be recovered for reuse in the process. When di-alkylbenzenes and/or tri-alkylbenzenes are the principal complex-forming hydrocarbons, the complex may be decomposed at relatively low temperatures by the use of vacuum distillation or by stripping with a low boiling inert hydrocarbon, such as a paraffin.

The reaction proceeds from the time that the complex is formed until the complex is decomposed, assuming that a suitable temperature exists. When it is desired to produce essentially only sac-alkyltoluene reaction product, for example, meta isopropyltoluene, it is necessary to take into account the total time elapsing from the time that the complex has been formed till the time that it has been decomposed in the distillative decomposition procedure. Thus, when using distillative decomposition procedure, it is necessary to consider the residence time of the complex in the decomposing zone as a part of the contacting time. Also, it is necessary to consider the temperature maintained in the decomposing zone. Generally the temperature in the decomposing zone should be no higher than the possible maximum usable in the contacting zone.

Di-sec-alkyltoluene at moderate temperatures disproportionates very slowly to the corresponding tri-derivative. Therefore, it is possible to distillatively decompose the complex of di-secondary alkyltoluene at temperatures as high as $+40°$ C. Somewhat higher temperatures may be used if the acid phase is very rapidly raised to the decomposition temperature and the HF and $BF_3$ are very rapidly removed from the acid phase.

The recovery of the meta secondary alkyltoluene product without back isomeirization to ortho and para isomers or disproportionation to the di-secondary alkyltoluene is the most difficult recovery to be made by distillative decomposition of the complex. It is obvious that operation at very low temperatures such as $0°$ C. or lower involves an expensive high vacuum operation since liquid HF boils at +20° C. at atmospheric pressure.

The preferred method of recovering high purity meta secondary alkyltoluene from an acid phase without back isomerization or disproportionation is the displacement of the meta secondary alkyltoluene from its HF and BF₃ complex by an alkylbenzene which forms a more stable HF and BF₃ complex. Broadly, the displacer is a polyalkylbenzene containing at least three alkyl groups which alkyl groups are selected from the class consisting of normal and secondary and which contain not more than four carbon atoms. Normal alkyl groups are methyl, ethyl, n-propyl and n-butyl. The secondary alkyl groups are isopropyl and secondary butyl.

Pentamethylbenzene and hexamethylbenzene are particularly effective displacers. However, the complexes formed by these compounds are so stable that quite elevated temperatures are necessary to decompose the complexes in order to recover the HF and BF₃.

The preferred tri-alkylbenzenes have the symmetrical configuration, i. e., 1,3,5-tri-alkylbenzene. The preferred tetra-alkylbenzenes possess the 1,2,3,5 configuration. These displacers are preferred because they do not tend to undergo rearrangement reactions and have better displacement effectiveness than the other isomers. The preferred displacers are mesitylene, tri-isopropylbenzene, di-isopropyltoluene and isodurene.

As it is normally impractical to operate under conditions wherein absolutely no di-secondary alkyltoluene is produced, it is desirable to operate with a displacer which will not complicate the problem of recovering the byproduct, di-secondary alkyltoluene. Therefore, it is preferred to use as the displacer in the process of this invention a poly-secondary alkyltoluene, for example, di-isopropyltoluene or di-secondary butyltoluene, corresponding to the sec-alkyl group charged.

Theoretically, 1 mol of added displacer will replace 1 mol of secondary alkyltoluene. However, greater amounts of displacer should be used. The amount of displacer used is dependent upon the total recovery of secondary alkyltoluene desired and also the effectiveness of the contacting of the acid phase and the displacer. It is preferred to operate with between about 2 and 6 mols of displacer per mol of secondary alkyltoluene present in the acid phase.

The acid phase possesses an extremely high solubility for aromatic hydrocarbons. Quite a large amount of displacer can be added to the acid phase without apparently displacing any secondary alkyltoluene. By the use of large amounts of displacer, it is possible to produce a second liquid phase which comprises displaced secondary alkyltoluene and displacer.

Since paraffinic hydrocarbons are soluble in the acid phase to only a relatively small extent, it is possible to wash from the acid phase-displacer solution the displaced secondary alkyltoluene. The wash hydrocarbon must be inert to the action of HF and BF₃ and non-reactive with the sec-alkyltoluenes present in the acid phase. Benzene may be used as a wash hydrocarbon. It is preferred to use as the inert hydrocarbon a low boiling liquid paraffin, such as, propane, butane, pentane and hexane.

The wash hydrocarbon may be introduced into the acid phase-displacer solution simultaneously with the displacer, preferably as a single solution; or the wash hydrocarbon may be introduced into the acid phase after the addition of the displacer. In order to avoid rearrangement reactions, it is preferred to introduce the wash hydrocarbon substantially simultaneously after the introduction of the displacer.

It is preferred to carry out the displacement operation in a continuous countercurrent apparatus; in such an operation the acid phase is introduced in an upper portion of the tower, the displacer is introduced at a lower portion of the tower and the inert wash hydrocarbon is introduced at a point below the point of entry of the displacer.

The amount of inert wash hydrocarbon introduced must be enough to remove substantially all the displaced secondary alkyltoluene. In general, the amount of inert wash hydrocarbon used is between about 50 and 500 volume percent based on secondary alkyltoluene displaced, preferably between about 150 and 250 volume percent.

The displacing zone should be operated at a temperature and for a contacting time such that essentially no rearrangement reactions take place therein. Thus, the contacting time in the displacing zone and the temperature therein must be considered in determining the total contacting time to be utilized in the process.

ILLUSTRATIVE EMBODIMENT

The annexed figure, which forms a part of this specification, shows an illustrative embodiment of a method of carrying out the invention to produce essentially pure meta isopropyltoluene by interacting isopropylbenzene and toluene. The figure is schematic and many items of equipment have been omitted, such as pumps, valves, etc., as these may be readily added thereto.

Isopropylbenzene from source 11 is passed by way of lines 12 and 13 into heat exchanger 14. From exchanger 14 it is passed by way of line 16 into line 17.

Toluene from source 19 is passed by way of valved line 21 and line 22 into heat exchanger 23. From exchanger 23, the added toluene and recycled toluene are passed by way of line 24 into line 17. The toluene to isopropylbenzene ratio is 1.1.

Anhydrous liquid hydrogen fluoride, 14 mols/mol of total alkylbenzene feed, is passed from the line 26, through heat exchanger 27 and line 28 into line 17. Heat exchangers 14, 23 and 27 bring the temperature of the isopropylbenzene, toluene and the liquid HF to a temperature of about −20° C. This temperature is about 10° lower than the desired reaction temperature of −10° C.

The contents of line 17 are introduced into mixer 31 which is provided with heat exchanger means 32. 1.2 mols of BF₃ per mol of isopropylbenzene from line 29 is introduced into mixer 31. Mixer 31 is an apparatus able to rapidly intermingle the hydrocarbons, liquid HF and BF₃. The heat exchanger means 32 withdraws heat of complex formation and prevents the temperature at the discharge end of mixer 31 rising above −10° C.

An acid phase consisting of liquid HF, dissolved complex, toluene and BF₃ is discharged from mixer 31. About 100 p. s. i. g. of pressure are maintained on the system to keep the excess BF₃ in the acid phase. The essentially single homogeneous acid phase is passed from mixer 31 by way of line 33 into reactor 34.

Reactor 34 is provided with heat exchanger means 36 and 37. Agitation is not needed to assist the reaction rate because of the single phase system existing in the reactor. To insure the maintenance of a substantially uniform temperature of −10° C. throughout the reactor, reactor 34 is provided with baffles 38a, 38b and 38c and motor driven agitator 39.

The acid phase is withdrawn from the top of reactor 34 and is passed by way of line 41 into the upper portion of displacing zone 42. The contacting time is measured as the time in mixer 31, reactor 34 and part of the total time in displacing zone 42. In this embodiment, a total time of about 15 minutes is utilized.

Displacing zone 42 consists of a vertical vessel adapted for intimate contacting of two immiscible phases in a continuous countercurrent manner. In this embodiment, the displacer, di-isopropyltoluene from source 46 is passed by way of lines 47 and 48 into heat exchanger 49. The contents of line 48, i. e., "outside" and recycled di-isopropyltoluene are brought to a temperature of −10° C. in heat exchanger 49 and are then introduced by way of line 51 into a lower intermediate portion of displacing zone 42. In this embodiment, 4 mols of displacer are introduced per mol of isopropyltoluene introduced into the displacing zone from line 41.

The very great solvent power of the liquid HF-complex solution for aromatic hydrocarbons, is overcome by adding pentane to the displacing zone. Pentane from source 53 is passed by way of valved line 54 and line 56 into heat exchanger 57. The contents of line 56, i. e., pentane from source 53 and recycled pentane are cooled in heat exchanger 57 to $-10°$ C. and introduced by way of line 58 into a lower portion of displacing zone 42, at a point below the entry of displacer from line 51. In this embodiment, 200 volume percent of pentane, based on isopropyltoluenes introduced from line 41, is introduced into displacing zone 42.

A raffinate phase is withdrawn overhead from zone 42. This consists essentially of pentane, benzene, toluene, meta isopropyltoluene, di-isopropyltoluene and some slight amount of HF and $BF_3$. The raffinate phase is introduced by way of line 61 into fractionation zone 62. This zone 62 is shown schematically since one skilled in the distillation art can devise the proper method of separating the raffinate phase into a pentane fraction, also including the HF and $BF_3$; a benzene fraction; a toluene fraction; a product meta-isopropyltoluene fraction and a displacer fraction.

A pentane fraction, which includes the HF and $BF_3$ present in the raffinate phase, is withdrawn and passed by way of lines 66 and 67 to line 56 for reuse in the displacing zone 42.

A benzene fraction is withdrawn from zone 62 and passed to storage by way of line 70. A toluene fraction is withdrawn and is recycled for reuse by way of lines 71 and 72.

A product fraction consisting essentially of meta isopropyltoluene is withdrawn from zone 62 by way of line 74. A bottoms fraction consisting of 1,3,5-di-isopropyltoluene is withdrawn by way of line 76 and recycled to zone 42 by way of line 79. Only a very slight amount of di-isopropyltoluene is made in this process; in general this production about balances the physical losses. Sometimes di-isopropyltoluene may be added or it may be withdrawn from the system. The necessary amounts of di-isopropyltoluene are made by operating the unit under conditions conducive to making this product.

The extract (acid) phase is withdrawn from displacing zone 42 and is introduced by way of line 86 into decomposing zone 87. Decomposing zone 87 is provided with internal heater 88 and some fractionation means, not shown. The temperature of $+40°$ C. in zone 87 is high enough to readily decompose the $HF-BF_3$ complexes but not high enough to disproportionate.

HF vapor and $BF_3$ gas are withdrawn from zone 87 and passed by way of line 91 into heat exchanger 92. In heat exchanger 92, the HF vapors are condensed and a liquid-gas stream is passed by way of line 93 into gas separator 94. $BF_3$ is withdrawn from gas separator 94 and is recycled by way of lines 96 and 29 to mixer 31. Make-up $BF_3$ is introduced from source 98 by way of valved line 99 into line 96. Liquid HF is recycled by way of lines 101 and 26. Make-up HF is introduced from source 102 by way of valved line 103 into line 101.

The hydrocarbon fraction is withdrawn and introduced by way of line 106 into fractionation zone 107, shown schematically herein. A pentane fraction is withdrawn and recycled by way of lines 109 and 67, etc. to displacing zone 42. A benzene fraction is withdrawn by way of line 110. A toluene fraction is withdrawn and recycled by way of lines 111 and 72, etc. to mixer 31. A bottoms fraction consisting of di-isopropyltoluene and a very slight amount of isopropyltoluene, is withdrawn by way of line 113 and recycled to zone 42 by way of line 79.

EXAMPLES

The results obtainable by the invention are illustrated by the following examples: The runs were carried out using a carbon steel reactor provided with a 1725 R. P. M. stirrer. The agent and reactants were added in the following order: (1) the alkyl group donor, (2) the alkyl group acceptor toluene, (3) commercial grade anhydrous HF and (4) commercial grade $BF_3$.

The contents of the reactor were agitated during the addition of the HF and $BF_3$. The contacting was continued at about constant temperature for the desired time.

The contents of the reactor were withdrawn into a vessel filled with crushed ice. An upper hydrocarbon layer formed over an aqueous layer. The hydrocarbon layer was decanted and washed with dilute ammonium hydroxide solution to remove HF and $BF_3$. The hydrocarbons were then water washed to remove ammonium hydroxide.

The hydrocarbon mixture was fractionated in a distillation column providing about 30 theoretical plates. Each product fraction was analyzed by a combination of boiling point, specific gravity, refractive index, ultraviolet and infrared spectra.

*Table 1*

| Run No. | 1 | | 2 | | 3 | | 4 | |
|---|---|---|---|---|---|---|---|---|
| Charge: Donor, type | Ethylbenzene | | Di-ethylbenzene | | Isopropyl-benzene | | p-di-t-butyl-benzene | |
| | mols | percent | mols | percent | mols | percent | mols | percent |
| Donor | 1.44 | 46 | 0.81 | 33 | 1.43 | 50 | 0.82 | 27 |
| Toluene | 1.66 | 54 | 1.65 | 67 | 1.44 | 50 | 2.17 | 73 |
| Toluene/Donor Alkyl Groups, ratio | 1.15 | | 1.02 | | 1.01 | | 1.32 | |
| HF, mols | 35 | | 30 | | 37.5 | | 30 | |
| $BF_3$, mols | 4.4 | | 2.36 | | 3.09 | | 3.43 | |
| HF/Feed, ratio | 11.3 | | 12.2 | | 13.1 | | 10.0 | |
| $BF_3$/Donor alkyl groups, ratio | 3.06 | | 1.46 | | 2.16 | | 2.09 | |
| $BF_3$/Donor, ratio | 3.06 | | 2.92 | | 2.16 | | 4.18 | |
| Temperature, °C | +19 | | +20 | | +12 | | +7 | |
| Time, Minutes | 30 | | 30 | | 30 | | 15 | |
| Product Recovery, percent | ---- | | 95 | | 96 | | 90 | |
| Reaction Product Mixture, mol percent: | | | | | | | | |
| Benzene | 37.2 | | 6.3 | | 42.7 | | 26.1 | |
| Toluene | 25.7 | | 45.0 | | 14.0 | | 32.1 | |
| Alkylbenzene | 0.8 | | 0.0 | | 0.5 | | 0.0 | |
| m-alkyltoluene | 26.2 | | 19.1 | | 34.5 | | 23.7 | |
| m-di-alkylbenzene | 8.5 | | 29.6 | | 2.5 | | 0.0 | |
| 1,3,5-di-alkyltoluene | 1.6 | | 0.0 | | 5.9 | | 16.2 | |
| Higher boiling | 0.0 | | 0.0 | | 0.0 | | 1.9 | |

The detailed results of the interaction of toluene and di-t-butylbenzene, isopropylbenzene and ethylbenzenes, respectively, are shown in Table I. Runs with di-t-butylbenzene and ethylbenzenes are shown for comparison.

In run 1, 98% of the ethylbenzene charged was converted. About one-third of the ethylbenzene disproportionated to m-di-ethylbenzene. Less than 10% of the interacted ethyl groups passed to 1,3,5-di-ethyltoluene. No tri-ethyltoluene or tri-ethylbenzene were produced. (In all runs the di-alkylbenzenes were meta isomer and the tri-alkylbenzenes were the 1,3,5-isomer, that is, within the error of infrared determination.)

Run 2 shows that di-ethylbenzene does not give the same product distribution as ethylbenzene, when operating at substantially the same conditions. Only 23% of the di-ethylbenzene interacted. Most surprisingly none of the di-ethylbenzene disproportionated to tri-ethylbenzene; also no ethylbenzene was produced. Runs 1 and 2 show that di-ethylbenzene is not as reactive as ethylbenzene and that with di-ethylbenzene charge the interaction is readily halted at the exclusively meta-ethyltoluene product stage.

In run 3 about 99% of the isopropylbenzene charged was converted. Only 5% of the isopropylbenzene disproportionated to produce di-isopropylbenzene—no tri-isopropylbenzene was formed. About 30% of the interacted isopropyl groups went to form di-isopropyltoluene. This compares with only 10% in the case of ethylbenzene in run 1. (The disparity is actually greater since run 3 was at a lower temperature than run 1.)

The extreme mobility of t-butyl groups is well shown in run 4. Even though the feed was a di-t-butylbenzene and the conversion was carried out at a lower temperature and for only one-half the time of the other runs, all of the di-t-butylbenzene interacted. In the absence of toluene, di-t-butylbenzene disproportionates to a mixture of mono-di- and tri-t-butylbenzene. Despite the low temperature and time an appreciable amount of side-reactions took place to produce high boiling material. Here about 60% of the interacted t-butyl groups went to form di-t-butyltoluene.

Quite a startling difference exists between the product distribution of run 2 (di-ethylbenzene) and run 4. Runs 1, 3 and 4 show that di-t-butylbenzene is much more reactive than isopropylbenzene and very much more reactive than ethylbenzene. These runs show that the interaction characteristics of the ethyl, isopropyl and t-butyl groups are not predictable—one from the other.

Thus having described the invention, what is claimed is:

1. An interaction process which comprises contacting, under substantially anhydrous conditions, a feed comprising essentially (a) toluene and (b) a member selected from the class consisting of sec-alkylbenzene, di-sec-alkylbenzene, tri-sec-alkylbenzene and mixtures thereof, wherein the alkyl groups are selected from only one member of the class consisting of isopropyl and sec-butyl, as essentially the only reactive components, in a mol ratio of toluene to sec-alkyl groups in said sec-alkylbenzene of at least 1, with between about 3 and 50 mols of liquid HF per mol of total alkylbenzene feed and at least 1 mol of $BF_3$ per mol of sec-alkyl groups in said sec-alkylbenzene, at a temperature between about —40° and +40° C. for a time sufficient for the formation of a fraction consisting of high purity meta-sec-alkyltoluene, removing HF and $BF_3$ to recover a product hydrocarbon mixture and recovering therefrom a fraction consisting of high purity meta-sec-alkyltoluene.

2. The process of claim 1 wherein said sec-alkylbenzene is isopropylbenzene, the temperature of contacting is between about —30° C. and about 0° C., the time of contacting at 0° C. is about 5 minutes and about 2 hours at —30° C., the longer times corresponding to the lower temperatures, and the product hydrocarbon mixture contains as essentially the only interaction product a fraction consisting essentially of meta isopropyltoluene.

3. The process of claim 1 wherein said sec-alkylbenzene is di-isopropylbenzene, said temperature of contacting is between about —30° C. and about 0° C. at a time of about 5 minutes at 0° C. and about 4 hours at —30° C., the longer times corresponding to the lower temperatures and said product hydrocarbon mixture contains as essentially the only interaction product a fraction consisting essentially of meta isopropyltoluene.

4. The process of claim 1 wherein said sec-alkylbenzene is isopropylbenzene and said contacting temperature is between about +10° C. and about +30° C. at a time of about 5 minutes at +30° C. and about one hour at +10° C., the longer times corresponding to the lower temperatures and said reaction product mixture containing a fraction consisting essentially of meta isopropyltoluene and a fraction consisting essentially of 1,3,5-di-isopropyltoluene, said di-isopropyltoluene being the predominant interaction product.

5. The process of claim 1 wherein said sec-alkylbenzene is di-isopropylbenzene and said contacting temperature is between about +10° C. and about +30° C. at a time of about 5 minutes at +30° C. and about 3 hours at +10° C., the longer times corresponding to the lower temperatures, and said reaction product mixture containing a fraction consisting essentially of meta isopropyltoluene and a fraction consisting essentially of 1,3,5-di-isopropyltoluene, said di-isopropyltoluene fraction being the predominant interaction product.

6. An interaction process which comprises contacting, under substantially anhydrous conditions, a feed comprising essentially (a) toluene and (b) a member selected from the class consisting of sec-alkylbenzene, di-sec-alkylbenzene, tri-sec-alkylbenzene and mixtures thereof, wherein the alkyl groups are selected from only one member of the class consisting of isopropyl and sec-butyl, as essentially the only reactive components, in a mol ratio of toluene to sec-alkyl groups in said sec-alkylbenzene of at least 1, with between about 3 and 50 mols of liquid HF per mol of total alkylbenzene feed and at least 1 mol of $BF_3$ per mol of sec-alkyl groups in said sec-alkylbenzene, at a temperature between about —40° and +40° C. for a time sufficient for the formation of a fraction consisting of high purity meta sec-alkyltoluene, contacting the acid phase from the interaction step with at least about 1 mol of a displacer per mol of secondary alkyltoluene present in said acid phase and substantially simultaneously thereafter with an amount of an inert liquid hydrocarbon sufficient to extract from said acid phase displaced secondary alkyltoluene, at a temperature below about 0° C. for a time such that substantially no rearrangement reaction takes place, and separating a raffinate phase comprising inert hydrocarbon and secondary alkyltoluene from an acid phase comprising HF, $BF_3$ and displacer and recovering from said raffinate phase a secondary alkyltoluene comprising essentially the meta isomer, and wherein said displacer is a poly-alkylbenzene containing at least 3 alkyl groups that are selected from the class consisting of normal and secondary, which contain not more than 4 carbon atoms.

7. The process of claim 6 wherein said displacer is isodurene.

8. The process of claim 6 wherein said displacer is 1,3,5-di-isopropyltoluene.

9. The process of claim 6 wherein said hydrocarbon is hexane.

10. The process of claim 6 wherein said hydrocarbon is pentane.

(References on following page)

References Cited in the file of this patent

UNITED STATES PATENTS

| | | |
|---|---|---|
| 2,396,965 | Passino | Mar. 19, 1946 |
| 2,420,073 | Frey | May 6, 1947 |
| 2,527,824 | Kemp | Oct. 31, 1950 |
| 2,528,893 | Lien | Nov. 7, 1950 |
| 2,564,073 | Lien | Aug. 14, 1951 |
| 2,589,057 | Corson et al. | Mar. 11, 1952 |
| 2,725,413 | McCaulay et al. | Nov. 29, 1955 |